March 8, 1960 F. T. MOSER 2,927,542
APPARATUS FOR MAKING ICE CREAM SANDWICHES
Original Filed April 11, 1956 3 Sheets-Sheet 1
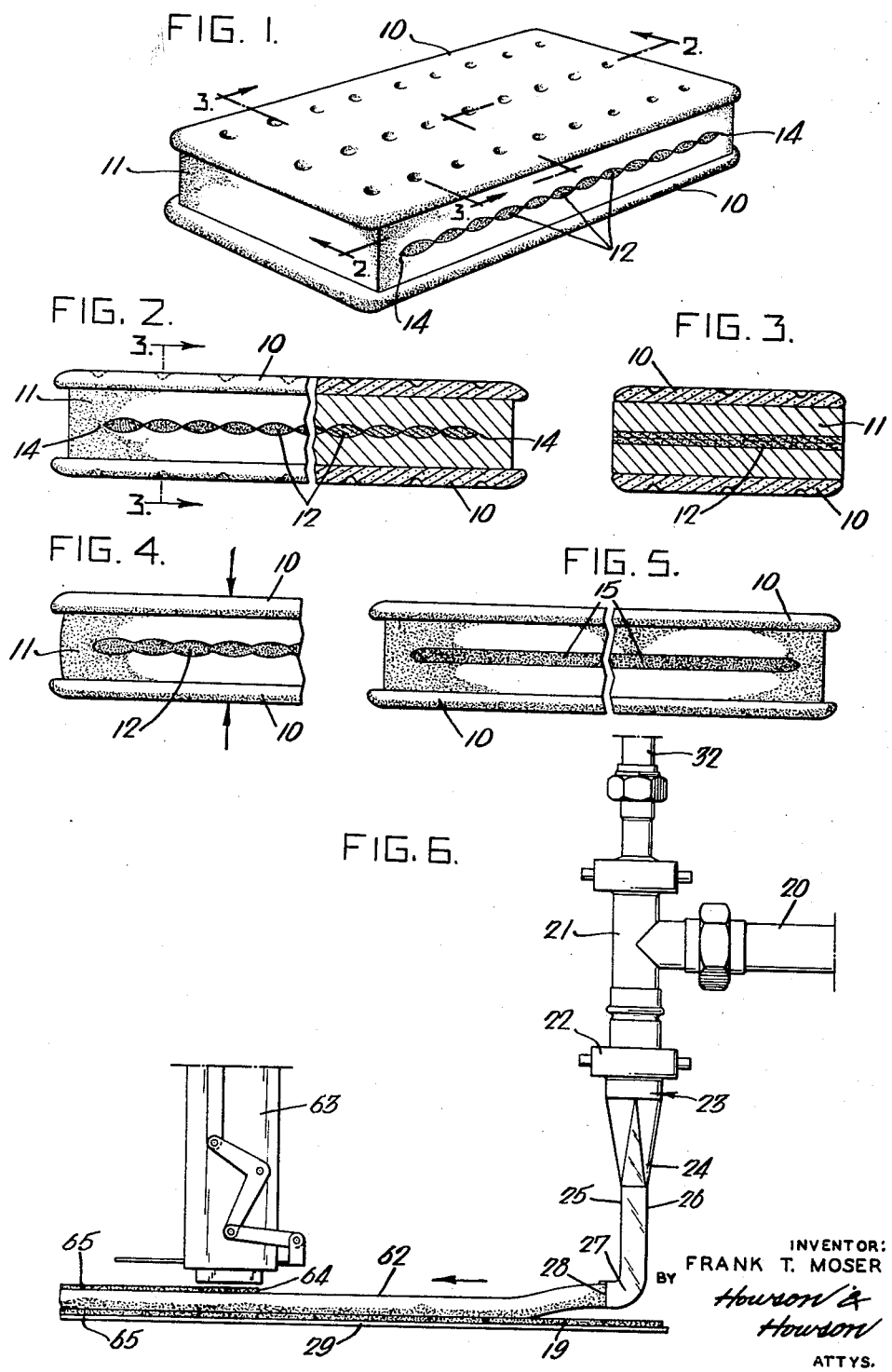
INVENTOR:
FRANK T. MOSER
BY Howson & Howson
ATTYS.

March 8, 1960  F. T. MOSER  2,927,542
APPARATUS FOR MAKING ICE CREAM SANDWICHES
Original Filed April 11, 1956  3 Sheets-Sheet 2
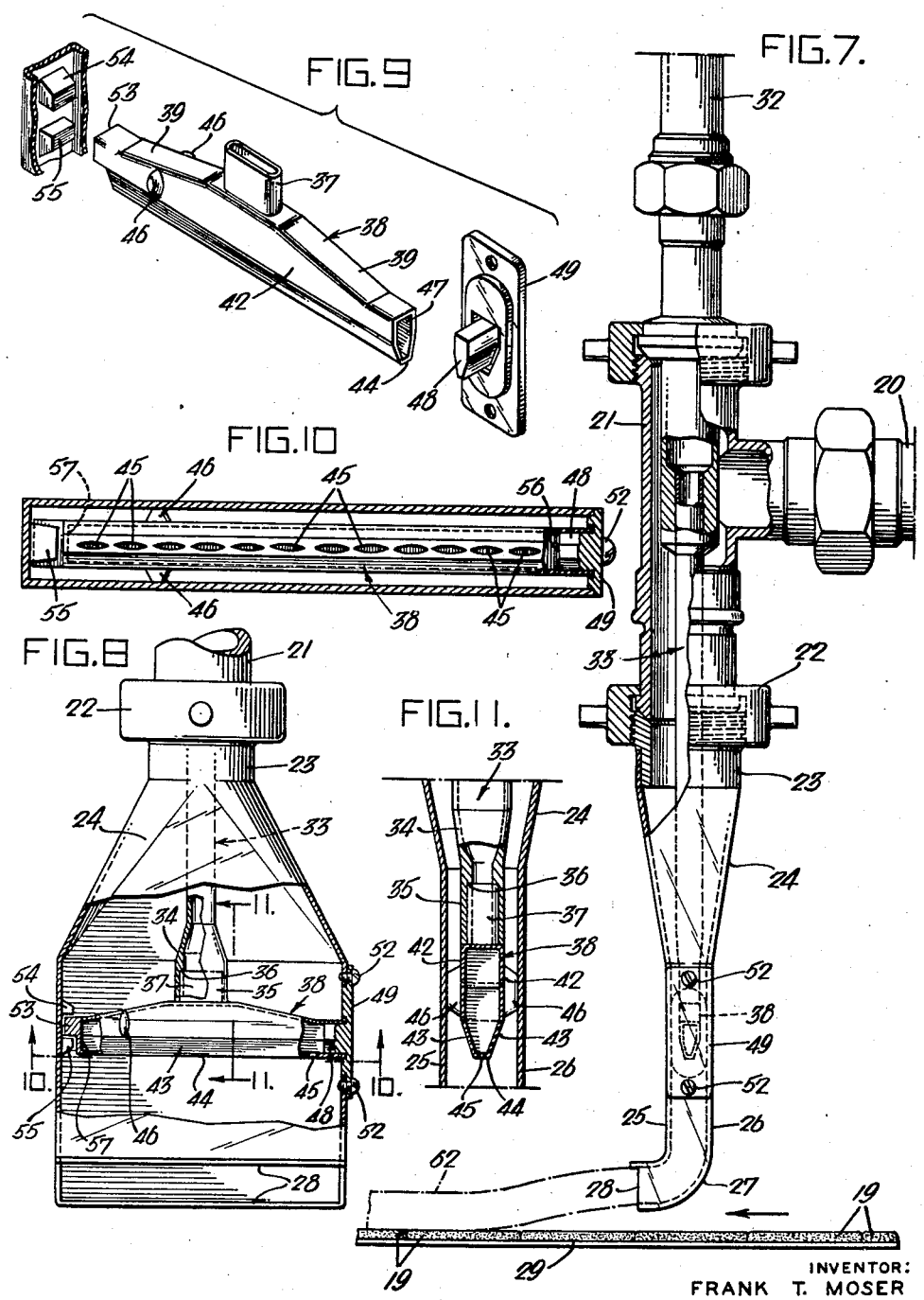
INVENTOR:
FRANK T. MOSER
BY Howson & Howson
ATTYS.

March 8, 1960 F. T. MOSER 2,927,542
APPARATUS FOR MAKING ICE CREAM SANDWICHES
Original Filed April 11, 1956 3 Sheets-Sheet 3
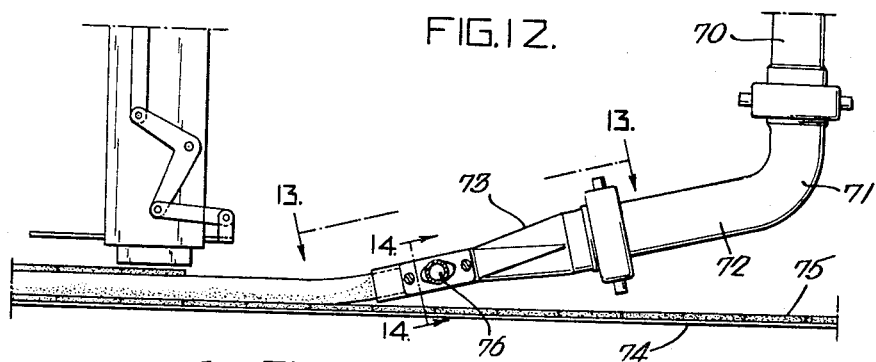
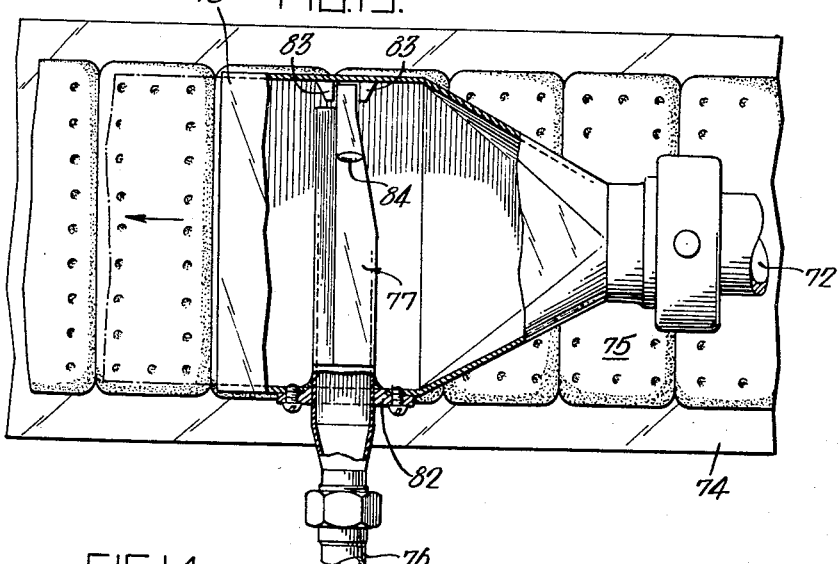
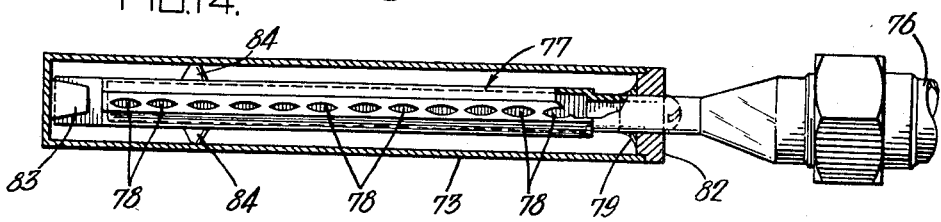
INVENTOR:
FRANK T. MOSER
BY
Howson & Howson
ATTYS.

United States Patent Office 2,927,542
Patented Mar. 8, 1960

2,927,542
APPARATUS FOR MAKING ICE CREAM SANDWICHES

Frank T. Moser, Easton, Pa., assignor to Kloss Mfg. & Supply Co., Allentown, Pa., a partnership Original application April 11, 1956, Serial No. 577,480. Divided and this application June 7, 1957, Serial No. 664,288

2 Claims. (Cl. 107—1)

This application is a division of my copending application, Serial No. 577,480, filed April 11, 1956, and entitled, Apparatus and Method for Making Ice Cream Sandwiches, and Product Thereof, now abandoned.

This invention relates broadly to a product which may be termed an ice cream sandwich-sundae, i.e., to a product consisting of a body of ice cream or equivalent frozen or chilled confection incorporating between its opposed faces a ribbon or layer of sauce or flavoring material and confined at its opposite flat faces between an opposed pair of crisp flat cakes or wafers. Features of the invention relate to the apparatus for making a product of this kind.

One object of the invention has been to provide an apparatus for making a sandwich confection of this kind in which the ice cream or equivalent mass is continuously advanced and extruded into the desired flattened shape, and in which the flavoring material is also continuously advanced and extruded as an advancing band or ribbon into the continuously advancing body of ice cream.

A further object has been to provide an apparatus having the foregoing features in which the opposed wafers are applied against opposite faces of the resulting continuously advancing band of ice cream incorporating the desired sauce or flavoring material.

A further object has been to provide such an apparatus in a relatively simple form which is economical to build and operate and which is reliable and consistent in manufacture of the desired confections.

A further object has been to provide such an apparatus in a form which is sturdy and which nevertheless may be readily taken apart for cleaning.

Still further objects and advantages of the invention and the manner in which they have been attained will be evident from reading of the following detailed description in the light of the attached drawings, in which, Figure 1 is a view in perspective of the improved confection to which the invention pertains, Figure 2 is a view partly in side elevation and partly in cross-section on the line 2—2 of Figure 1, Figure 3 is a cross-section on the line 3—3 of Figures 1 and 2, Figure 4 is a side elevation corresponding to the left end portion of Figure 2, illustrating the nature of the distortion of the product under pressure of being eaten, Figure 5 is a side elevation of a modified form of the confection, Figure 6 is a side elevation of one form of apparatus of the invention, Figure 7 is an enlarged detail view corresponding generally to Figure 6, but partly in section, Figure 8 is a view similar to Figure 7, but illustrating only the parts of the apparatus involved in the extruding and discharging operations, and taken at right angles to Figure 7, Figure 9 is a detailed perspective view of the extrusion apparatus for the flavoring material, including the delivery head and its associated mounting members, Figure 10 is a cross-section on the line 10—10 of Figure 8, Figure 11 is a cross-section on the line 11—11 of Figure 8, Figure 12 is a side elevation of a modified form of apparatus of the invention, Figure 13 is a view, partly in plan and partly in cross-section, taken in the direction of the arrows 13—13 of Figure 12, and Figure 14 is a cross-section on the line 14—14 of Figure 12.

As illustrated in the drawings, the sandwich comprises a pair of opposed flat, crisp cakes or wafers 10, 10 having interposed therebetween a complemental mass or body of ice cream or equivalent frozen or chilled comestible 11. A layer or ribbon 12 of flavoring material or sauce is provided between the opposed flat surfaces of the ice cream mass, preferably in substantial parallelism with said surfaces and substantially midway therebetween. As illustrated in Figures 1 and 2, the longitudinal ends of this body of viscous sauce terminate at 14 short of the ends of the ice cream mass and the upper and lower surfaces of the band or layer of sauce are wavy in outline. As a consequence of these facts the danger of dripping of the sauce in the eating of the sandwich is minimized. As illustrated in Figure 4, there is a tendency for the sauce to flow into the troughs of the wavy outline when pressure is applied by the teeth against the upper and lower faces of the sandwich.

Figure 5 illustrates a modified form of the confection in which the flavoring material is a substantially flat body 15 on its opposite faces instead of being wavy in outline. This form of sandwich may be manufactured by a quite simple modification of the machine discussed hereinafter, simply by providing a flavoring sauce extrusion head heaving an outlet of substantially rectilinear shape in place of the substantially oval outlets discussed hereinafter.

As illustrated in Figures 6 and 7 of the drawings, the conduit through which ice cream is delivered to the apparatus of the invention includes an inlet portion 20 which may be connected to suitable apparatus for impelling the ice cream through the ice cream conduit of the invention including the extrusion head or section 23, a T section 21 and a coupling 22 by which the ice cream extrusion section of the conduit is coupled to other portions thereof. The extrusion section 23 includes a substantially cylindrical upper portion connected with the coupling 22 and a widened and flattened depending portion 24 by which the ice cream is delivered into the lower end of the conduit including opposed flat wall portions 25 and 26, the bend 27 by which the ice cream is directed in a substantially horizontal plane and the discharge end 28 from which it is delivered upon a horizontally extending traveling belt 29 containing the wafers 19 to form parts of the sandwiches being made.

The sauce or flavoring material is delivered to the apparatus through an inlet conduit 32 which, like the inlet end 20 of the ice cream conduit, is connected with a source of the flavoring material and an impeller by which this flavoring material is continuously fed into the interior portion of the mass of ice cream being simultaneously fed to the apparatus. The lower portion 33 of the feed conduit for the flavoring material extends within the ice cream conduit in spaced relation within the walls thereof, and this portion of the flavoring material conduit is, like the ice cream conduit, widened and flattened as indicated at 34 to convert the advancing cylindrical mass of sauce into this widened and flattened shape as it passes through the portion 35 of the flavoring material conduit into a delivery head 38 which has on its upper end a neck 37 telescopically secured within the surrounding wall 35 and abutting the shoulder 36.

The upper wall of the delivery head 38 is imperforate except for the neck 37 which receives sauce from the overlying portions of the conduit, and this wall tapers downwardly in opposite directions from its central portion as indicated at 39. The opposed side walls of the delivery head are substantially flat and parallel to each other in their upper portions, as illustrated at 42, but they taper inwardly toward their lower ends at 43 and terminate in a bottom wall 44 which is provided with a plurality of substantially oval extrusion outlets extending in a substantially straight line as indicated at 45.

The opposite sides of the side wall portions 42 are provided with lugs 46 which extend into contact with the opposed inner surfaces of the opposed walls 25 and 26 of the ice cream conduit when the parts are assembled in operative position. The parts are mounted for convenient assembly and cleaning by providing the delivery head with an open end as indicated at 47, and mounting this end telescopically over a complemental lug 48 secured at the inner surface of an end plate 49 which is screw-threadedly secured at 52 to the ice cream conduit.

The end 53 of the delivery head which is opposite to the end 47 is reduced and closed, and this end is received between a pair of lugs 54 and 55 provided on the inner wall of the ice cream conduit. By reference to Figure 10, it will be noted that the closed end of the delivery head 38 adjacent the lugs 54 and 55 as well as the position of the inner surface of the lug 48 are spaced inwardly from the adjacent walls of the ice cream conduit as illustrated at 57 and 56, and this insures that the band or body of flavoring material extruded and deposited within the advancing mass of ice cream terminates inwardly of the ends of that mass of ice cream, as illustrated at 14 in Figure 1 of the drawings.

From the foregoing discussion it will be evident that both the body of ice cream and the inwardly disposed body of flavoring material are narrowed and widened as they approach the zone of confluence, and that the laminated body of ice cream containing the deposited flavoring material is discharged as an endless stream continuously upon the wafers 19 advancing upon the delivery belt 29. As this body of material deposited upon the end-to-end-arranged wafers advances as indicated at 62 beneath the position of the delivery head 63 for deposition of the upper wafers 64, the materials to produce the sandwiches are completed in their assembled relationship, and it is therefore necessary only to sever these materials along the lines 65 by handling or cutting apparatus of a type conventional in this art, in order to complete manufacture of the sandwiches.

The form of the invention illustrated in Figures 12–14 is similar in general principle to that discussed above, the principal differences being that in Figures 12–14 the extrusion operations and combining of the ice cream and sauce streams are performed during flow of the materials in a substantially horizontal direction, while the flavoring material is delivered to its extrusion or delivery head in a direction substantially parallel to the axis of the extrusion head.

Referring to Figure 12, it will be seen that the feed conduit 70 for the ice cream is bent at 71 to provide an end portion 72 and widened and flattened extrusion walls 73 extending in a direction forming but a small angle to the horizontal plane of the belt 74 and wafer feed line 75. The flavoring material is fed by a substantially coaxial conduit 76 into extrusion head 77 and is extruded into the body of ice cream through oval outlets 78 in a direction substantially at right angles to its line of flow into the head 77. This flavoring material extrusion head may be secured detachably as in Fig. 13 or by welding at 79 to the inner circumference of a plate 82 by which it is secured to the ice cream conduit, and the head 77 may be further located and secured by lugs 83 and spacing lugs 84 in a manner similar to the first embodiment.

From the foregoing discussion, it will be evident that I have attained all of the objects of the invention by advancing and extruding a band of sauce, such as chocolate flavoring material or the like, continuously into a mass or body of ice cream which is flattened and thereafter positioned between a pair of opposed wafers to complete the sandwich.

While the invention has been described primarily by reference to two forms of the product and two forms of apparatus for making it, persons skilled in the art will be aware that various refinements and modifications are available. I therefore wish it to be understood that this invention is not to be limited in interpretation except by the scope of the following claims.

What is claimed is:

1. In an apparatus for making ice cream sandwiches comprising a pair of opposed edible wafers, a flattened mass of ice cream occupying the space between said wafers and a layer of plastic flavoring material disposed between opposite faces of said flattened ice cream mass, the combination comprising a conduit for receiving and directing a flowing mass of ice cream and including wall portions having substantially flat, opposed, interior surfaces terminating in a delivery end, and a flavoring material conduit having a portion located interiorly of said first-mentioned conduit and terminating in a delivery head having an extrusion outlet portion directed toward said delivery end and extending in a line across the line of flow established by said first-mentioned conduit, opposed lugs extending inward from the first-mentioned conduit to hold the flavoring material delivery head centered therein, said delivery head having a smaller side open for cleaning the head and telescopically fitting one of said lugs, which thereby closes said open side of the delivery head.

2. In an apparatus for producing an advancing flattened mass of ice cream having a layer of plastic flavoring material disposed between opposed faces thereof, the combination comprising a conduit for receiving and directing a flowing mass of ice cream and including wall portions having substantially flat, opposed, interior surfaces terminating in a delivery end, and a flavoring material conduit terminating in a delivery head having an extrusion outlet portion directed toward said delivery end, said delivery head having a series of alined openings in its outlet portion and having one of its two smaller and opposite sides open for cleaning, and means carried by the first mentioned conduit for positioning the delivery head centrally therein, said means including a member detachably secured to the conduit for closing said open side of the delivery head.

References Cited in the file of this patent

UNITED STATES PATENTS

| | | |
|---|---|---|
| 498,142 | Thoems | May 23, 1893 |
| 729,933 | Heilmann-Taylor | Jan 2, 1903 |
| 2,188,418 | Routh | Jan 30, 1940 |
| 2,271,767 | Hummel | Feb. 3, 1942 |
| 2,344,901 | Routh | Mar. 21, 1944 |
| 2,347,083 | Connellee et al. | Apr. 18, 1944 |

FOREIGN PATENTS

| | | |
|---|---|---|
| 15,745 | Austria | Mar. 26, 1904 |
| 512,377 | Germany | Nov. 10, 1930 |